(12) United States Patent
Bürger

(10) Patent No.: US 6,468,001 B1
(45) Date of Patent: Oct. 22, 2002

(54) METHOD FOR REDEVELOPING OR RENOVATING SEWER DRAINS AND SEWER DUCTS

(76) Inventor: Joachim Bürger, Pinedale House, Curracloe-Kilmacoe County Wexford (IE)

( * ) Notice: Subject to any disclaimer, the term of this patent is extended or adjusted under 35 U.S.C. 154(b) by 0 days.

(21) Appl. No.: 09/744,696
(22) PCT Filed: Jul. 21, 1999
(86) PCT No.: PCT/EP99/05213
§ 371 (c)(1),
(2), (4) Date: Jan. 29, 2001
(87) PCT Pub. No.: WO00/06932
PCT Pub. Date: Feb. 10, 2000

(30) Foreign Application Priority Data

Jul. 28, 1998 (DE) .......................... 198 33 885

(51) Int. Cl.⁷ .................................. E02F 5/10
(52) U.S. Cl. ....................... 405/184.2; 138/97
(58) Field of Search ............... 405/36, 51, 132, 405/133, 150.1, 151, 184.1, 184.2, 303; 138/97

(56) References Cited

U.S. PATENT DOCUMENTS

| | | | | |
|---|---|---|---|---|
| 4,211,576 A | * | 7/1980 | Yan | 106/278 |
| 535,551 A | * | 6/1997 | Lee | 524/52 |
| 6,089,275 A | * | 7/2000 | Steketee, Jr. | 138/98 |

* cited by examiner

Primary Examiner—Thomas B. Will
Assistant Examiner—Tara L. Mayo
(74) Attorney, Agent, or Firm—Mallinckrodt & Mallinckrodt; Robert R. Mallinckrodt

(57) ABSTRACT

A method for redeveloping or renovating sewer conduits and sewer ducts, with which a large amount of scrap rubber can be used. Tube of low inherent stability are produced from scrap rubber and plastic material. These tubes are introduced into old sewer pipes of the sewer ducts, the tube of low inherent stability being supported by the wall of the old sewer pipe.

7 Claims, 2 Drawing Sheets

METHOD FOR REDEVELOPING OR RENOVATING SEWER DRAINS AND SEWER DUCTS

TECHNICAL FIELD

The invention relates to a method for redeveloping or renovating sewer conduits and sewer ducts. Redeveloping or renovating are measures for improving the present performance of sewer drains and sewer ducts, the original substance being completely or partly included. In the following only the redeveloping of sewer drains is described, including, however, the redeveloping as well as the renovating of sewer drains as well as sewer ducts.

BACKGROUND ART

Sewer drains have to be redeveloped from time to time because the sewer drains are subject to environmental influences and, after a certain time, cannot meet the wanted requirement anymore, for example due to leakage.

In Germany, for example, sewer ducts of a length of several hundreds of thousands of kilometers have to be redeveloped in the near future. In Germany there are approximately 1,400,000 km sewer ducts. Approximately 750,000 km have to be redeveloped. According to calculations this will cost up to 150 billions ($150 \times 10^9$) deutschmarks during the next years.

Today, plastic tubes (for example of polypropylene) are used for redeveloping sewer ducts. Several different lining methods are used. One method group of the lining methods is the so called tube relining, with which self-supporting plastic tubes are introduced as sections into the sewer pipes to be redeveloped in order to restore or improve the resistance to physical, chemical, biochemical and/or biological corrosion for preventing the new formation of incrustations, for restoring and/or improving the static load capacity and the water tightness. Thereby, the dimensions of cross section of the sewer pipes to be redeveloped or of the access pits are reduced.

The relining methods can be distinguished into piping relining, long-tube relining and section is inserted in one single operating cycle into the section of the sewer pipe to be redeveloped. An annular space is formed between the plastic piping constituting the "inliner" and the sewer pipe to be redeveloped. This annular space is filled by a filling material. For example sands, free-flowing hydraulically bondable materials and foaming masses are used as filling material. The method is independent of the cross-sectional shape of the sewer pipe. As a rule, circular cross sections in the nominal value range of DN 80–DN 2000 with lengths up to 700 m are redeveloped depending on the condition of the line of the mounting. In contrast to the piping relining, during long-tube relining and short-tube relining self-supporting single tubes are introduced discontinuously into the sewer pipes to be redeveloped. Also these methods can be adapted to the different shapes of cross-section of the sewer pipes. The redeveloping method to be used depends on the local conditions.

The redeveloping of sewer ducts is subject to several problems. On one hand, it is very expensive and, on the other hand, environmental problems arise because ecological damages occur.

A further environmental problem is the sanitation of scrap rubber, in particular of used vehicle tires. In order to prevent environmental pollution, during the last years there have been made a lot of efforts to reutilize such old tires and to make use of the valuable energy source.

The raw material utilization of old tires is concentrated on different methods of pyrolysis, hydrogenation and gasification. The products resulting thereby (oils, gases, coke, soot. etc.) normally have to be purified before utilization and are expensive. The raw material utilization furthermore sets free pollutants and has to be combined with expensive method steps for sewage clarification and exhaust gas clarification.

Today, the energetic utilization of old tires comprises the controlled combustion of old tires in the cement industry. However, there are already capacity bottlenecks.

Furthermore, stability problems in the production process of the cement production occur when the feeding rate is high.

The importance of dumping of old tires decreases more and more due to the fact that the costs of the dumping ground rises. Further problems are the potential fire risk, the spontaneous pyrolysis and the risk of affect of parasites.

Furthermore, there is a need of action in the field of sanitation of old tires because of criminal dispose of old tires which occur more often.

Several methods are known for reutilization of scrap rubber, in particular old tires.

EP-PS 0 493 732 discloses a method for preparation of sulfurous scrap rubber. The rubber is comminuted to ground rubber. Then, from the comminuted rubber, reclaimed rubber is generated by devulcanization. The comminuted rubber is held in a bacterial suspension of chemolithotropic microorganisms during supply of air until the sulfur is separated as elementary sulfur and/or sulfuric acid partly or completely from the remaining replastified reclaimed rubber. The reclaimed rubber thus replastified is reused in certain portions of weight in the t read mixture when retreading old tires.

DE-OS 44 31 336 discloses material compositions which contain a mixture of pulverized old tires, one or several resinous substances and chemical reagents. The resinous substances are chosen from polypropylene resin, polyethylene resin of low density and polyethylene resin of high density. The chemical reagents are chosen from the group of acetone, coustic soda, glass wool, ammonium phosphate, starch and pigments. In order to fabricate structural products from these-material compositions, the components are mixed together, the mixture is melted at 230 to 350° C. an d the mixture is drawn by means of a rotational molding method, extrusion method or press-form method. When producing sewer pipes according to this method, the material composition comprises pulverized old tires and resinous substances as well as acetone, glass wool, ammonium phosphate and/or starch. The additions acetone, glass wool, ammonium phosphate and/or starch serve, for example, to improve the inherent stability of the sewer pipes.

DE-OS 44 33 961 discloses a method for fabricating structural products and flat articles from a recycling mixture on the basis of ground rubber and polyethylene. The polyethylene is melted and kneaded. The ground rubber and possibly additional substances are added. The polyethylene mixture is then kneaded by a roller.

DE-OS 42 20 623 discloses a method for fabricating fine-grained rubber powder from vulcanized old tires, the produced rubber powder compounded with recycled thermoplastics of the same fineness being able to be processed to a new raw material.

DISCLOSURE OF THE INVENTION

It is the object of the invention to provide a favorable method for redeveloping sewer ducts.

According to the invention this object is achieved by (a) producing a tube of low inherent stability from scrap rubber and plastic material, and (b) introducing this tube into an old sewer pipe of the sewer ducts, the tube of low inherent stability being supported by the wall of the old sewer pipe.

In this context, tubes of low inherent stability means tubes which cannot withstand the load exposed to a sewer pipe. Such loads are, in particular, the pressure exerted by the soil.

The invention is based on the realization that the inherent stability of tubes used for redeveloping sewer ducts does not have to be very high when they are introduced into old sewer pipes of the sewer ducts already present. Then, these tubes of low inherent stability can be supported by the walls of the old sewer pipes and by the annulus filling.

Thus, a particular advantage of the method according to the invention is that the tubes can be fabricated exclusively from scrap rubber and plastic material. Because high inherent stability is not required, there is no need for normally used additional substances for increasing the inherent stability.

Due to the method according to the invention, the costs for redeveloping sewer ducts can be kept small, because the production costs for tubes constructed from scrap rubber and plastic material are lower than for tubes of pure plastic material (polypropylene) usually used.

The plastic material used for producing the tube can, for example, be polyethylene or polypropylene and fresh as well as recycled plastic material can be used. The scrap rubber used for producing the tube can be obtained from various scrap rubber sources. It can, for example, be functionalized EPDM (ethylene-propylene-diene-terpolymer).

Preferably, the scrap rubber used for producing the tube is processed to ground fine-grain rubber having a grain size of <1 mm. This achieves a good miscibility with the plastic material. However, also certain additives can be used by means of which the miscibility of the scrap rubber and the plastic material is improved. Such additives are, for example, slip additives as crystalline polypropylene waxes having a molecular weight of about 2000.

When producing the tube the proportion of the ingredients scrap rubber and plastic material can be chosen variously. It has been shown to be particular favorable to use 50 to 70 percent in weight of scrap rubber and 30 to 50 percent in weight of plastic material.

As explained above, old tires can be used for producing the tube of low inherent stability. Thus, the method according to the invention also solves important environmental problems, because a very large amount of old tires can be used. The amount of old tires in Germany is approximately 600,000,000 kg per year. It can be shown that all of the old tires obtained during a time period of about 12 years can be used up when redeveloping the sewer ducts using the method according to the invention. This number is achieved by assuming that the share of scrap rubber (including soot and filling material) in old tires is approximately 70%. This results in an amount of scrap rubber of 420,000,000 kg per year. With an approximate density of the scrap rubber of 0.93 g/cm$^3$, the volume of scrap rubber is calculated to be 450,000 m$^3$. With an average cross-section of a sewer duct of DN 500 (500 mm) the circumference is 1.57 m. With a redeveloping requirement of 750,000 km sewer ducts, this results in a surface of approximately 1,200,000,000 m$^2$. With a thickness of the layer (corresponding to the wall thickness of the tube) of 6 mm this results in a volume of 7,200,000 m$^3$. When 70% of the used material is scrap rubber, this results in a volume of 5,100,000 m$^3$ to be filled by scrap rubber. Thus, the method according to the invention supplies a long-term solution for elimination of old tires, the life-cycle costs for the sanitation of old tires being saved.

When producing the tubes of old tires using the method according to the invention it can be proceeded as follows:

First the old tires are sorted according to rubber quality, shredded, granulated, ground and made free from foreign substances (steel, textural nylon etc.). The grinding can be effected in the form of warm grinding as well as cold grinding (cryogen grinding). The individual process steps are known per se.

Apart from untreated ground rubber also particularly treated ground rubber can be used. This ground rubber can be produced according to one of the known methods for producing ground rubber, for example according to the method described in EP-PS 0 493 732. The surface modified ground scrap rubber produced by means of this method is, in connection with plastic material (for example polypropylene or polyethylene) well suitable for producing plastic products.

The plastic material, for example polypropylene, used for producing the tubes using the method according to the invention is mixed with the ground rubber likewise according to a prior art method, such that a raw mixture is created.

Now, from this raw mixture, tubes or structural parts are produced by extrusion, rotational molding or press production processes giving the tubes or structural parts a desired thickness, size and cross-sectional shape. The material properties of the thus produced tubes are set through the composition of the raw mixtures and the processing parameters. Such methods are known per se.

The tubes of low inherent stability produced by using the method according to the invention are then introduced into the old sewer pipes according to one of the above mentioned relining methods.

When the outer dimensions of the tube of low inherent stability are smaller than the inner dimensions of the old sewer pipe, such that a space is formed between the tube of low inherent stability and the old sewer pipe, the consumption of scrap rubber used in the method according to the invention can be increased further by filling this space by scrap rubber or by a material containing scrap rubber.

The cross-sectional shape of the used tubes of low inherent stability can be arbitrary. Advantageously, however, they are adapted to the cross-sectional shape of the old sewer pipe and can be circular.

An embodiment of the invention will now be described in greater detail.

BRIEF DESCRIPTION OF THE DRAWINGS

The best mode presently contemplated for carrying out the invention is illustrated in the accompany drawings, in which.

PREFERRED EMBODIMENT OF THE INVENTION

In the embodiment described herein for redeveloping sewer ducts old tires are used. The old tires are processed to untreated or particularly treated ground rubber according to one of the prior art methods. In a preferred method the gathered old tires are comminuted mechanically and cooled down by means of liquid nitrogen to a temperature below −40° C. (solidification point of rubber). The tire portions are crushed in a mill and decomposed into the components rubber, textiles and steel. The chosen particle size during the further comminution of the rubber is ≦500μm. Subsequently, the ground rubber is suspended and mocrobially treated in a bioreactor at moderate temperature while supplying air. The microorganisms are particular sulfur oxidizing microorganisms. These causes devulcanization at the particle surface by microchemical dissociation of the polysulphide bridges. The polymeric chains remains undamaged. After the biological step a separation of the suspension is effected by sedimentation and filtration. The separated ground rubber is dried carefully and made ready.

The ground rubber thus functionalized is compounded with a polypropylene (for example PP Hostalten PPT 1070 EU, natural) in a double screw extruder. The polypropylene is introduced gravimetrically and the ground rubber is introduced volumetrically through a lateral supply. The molten mass enters into the water-ring granulation through an adapter (Y-tube). The granulator has 12 bores having a diameter of 3 mm and three knives. The mass temperature is between 170° C. and 250° C., preferably 200° C.

Then tubes are produced from this raw mass by means of a single-screw extruder. The screw diameter of the extruder is 100 mm. The extruder temperature is 200° C. A vacuum tank calibration is used.

The production of a tube can also be made in one single working cycle, the step of compounding being dropped. The mass temperatures are in a range between 170° C. and 250° C. The number of screws of the extruder and all of the other parameters (for example vacuum or screw diameter) can be chosen freely as required.

Figure 1:
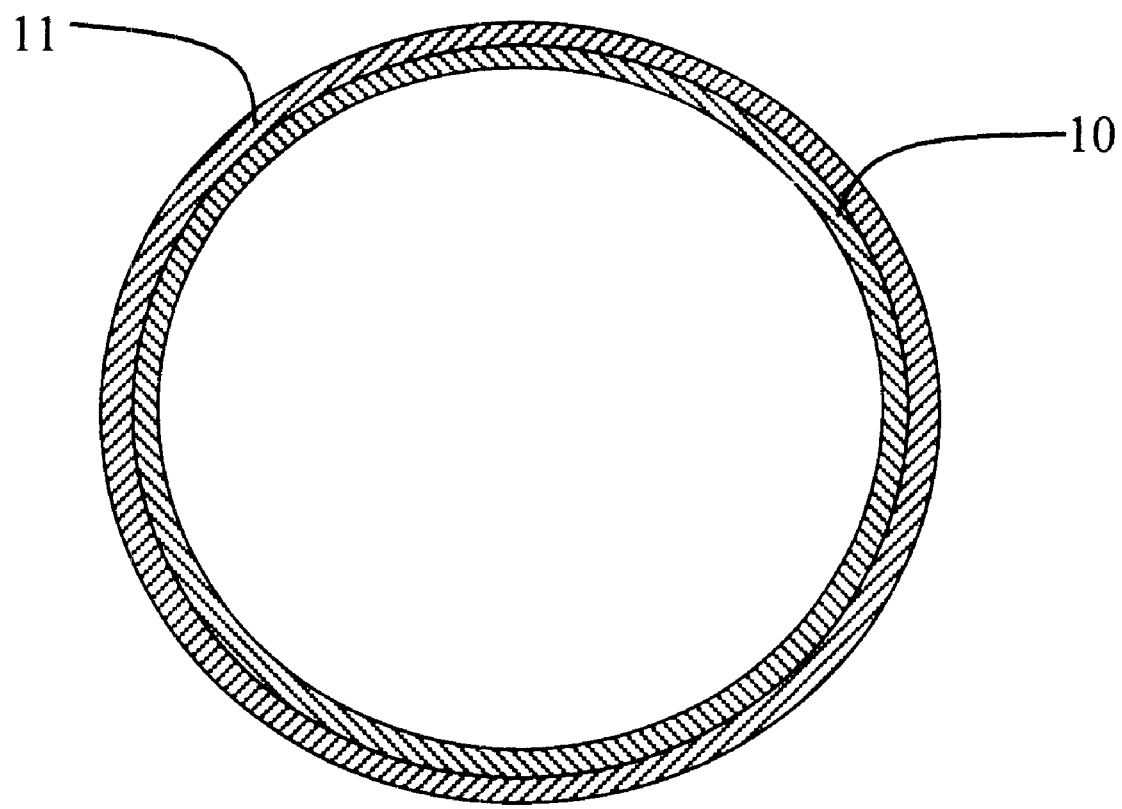
FIG. 1 is a vertical section showing a tube of low inherent stability positioned in an old sewer pipe.
Figure 2:
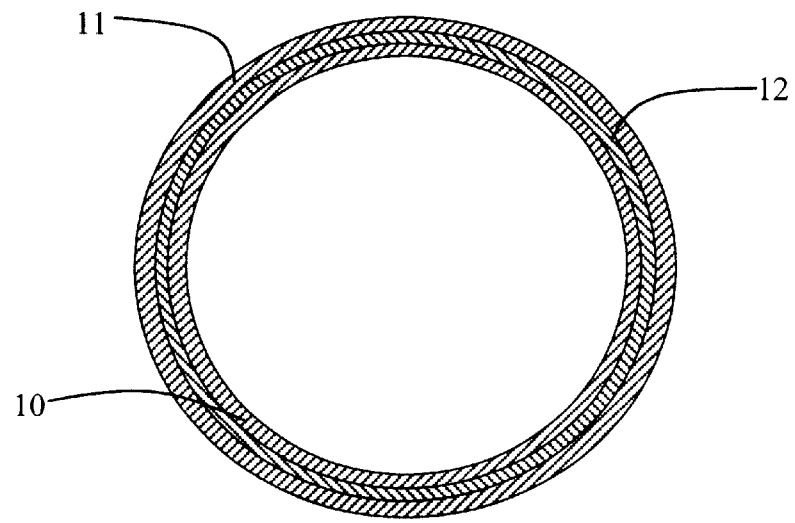
FIG. 2, a vertical section showing a tube of low inherent stability positioned in an old sewer pipe wherein the tube of low inherent stability is smaller than the inner dimensions of the old sewer pipe and filler material is positioned between the tube of low inherent stability and the old sewer pipe.
Figure 3:
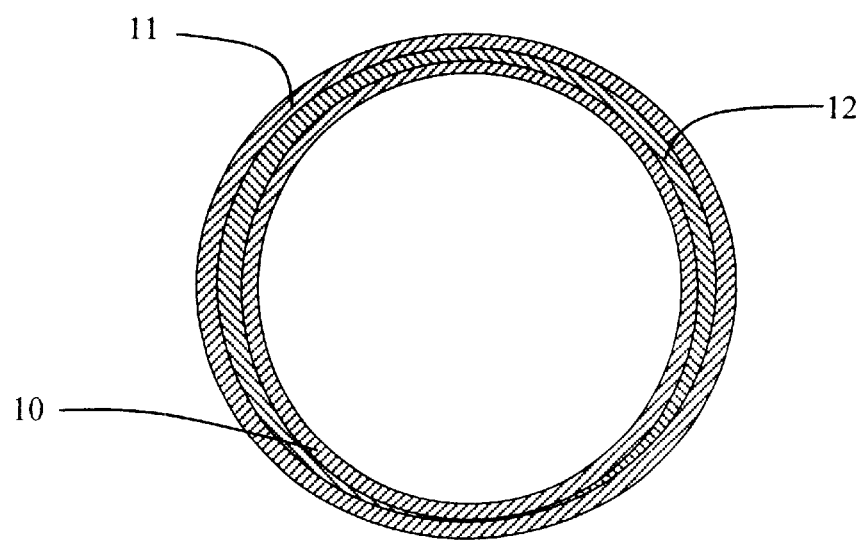
FIG. 3, a vertical section similar to that of FIG. 2, but with the tube of low inherent stability in a different position relative to the old sewer pipe.

The tubes 10, FIGS. 1–3, thus produced are now introduced into the old sewer pipes 11 according to one of the prior art relining methods. Such methods are known per se and therefore not described in detail herein.

When the outer dimensions of the tube 10 of low inherent stability are smaller than the inner dimensions of the old sewer pipe 11, such that a space is formed between the tube of low inherent stability 10 and the old sewer pipe 11, FIGS. 2 and 3, the consumption of scrape rubber used in the method according to the invention can be increased further by filling this space by scrape rubber or a material containing scrape rubber as indicated at 12.

What is claimed is:

1. A method for redeveloping or renovating sewers, comprising steps of:
   (a) producing a tube of relatively low inherent stability from scrap rubber and plastic material, and
   (b) introducing said tube into an already installed, relatively high inherent stability sewer pipe to be redeveloped or renovated of said sewers, said sewer pipe having a wall, said tube of low inherent stability being supported by said wall of said sewer pipe, and
   wherein said tube is produced to have outer dimensions smaller than inner dimensions of said sewer pipe, whereby an annulus is formed between said tube and said sewer pipe, and said annulus is filled by a material containing scrap rubber.

2. A method as claimed in claim 1, wherein said scrap rubber used for producing said tube of relatively low inherent stability is obtained from scrap tires.

3. A method as claimed in claim 1, wherein said scrap rubber used for producing said tube of relatively low inherent stability is obtained from functionalized EPDM (ethylene-propylene-diene-terpolymer).

4. A method as claimed in claim 1, wherein said plastic material used for producing said tube of low inherent stability is polypropylene.

5. A method as claimed in claim 1, when said tube of low inherent stability is produced, the proportion of the ingredients of scrap rubber and of plastic material is chosen to be 50 to 70 percent in weight of scrap rubber and 30 to 50 percent in weight of plastic material.

6. A method as claimed in claim 1, wherein, when said tube of low inherent stability is produced, additives for improving the miscibility of said scrap rubber and said plastic material are used.

7. A method as claimed in claim 1, wherein said scrap rubber used for producing the tube of relatively low inherent stability is processed to ground fine-grain rubber having a grain size of <1 mm.

\* \* \* \* \*